(12) United States Patent  
Post

(10) Patent No.: US 8,954,647 B2
(45) Date of Patent: Feb. 10, 2015

(54) SYSTEMS AND METHODS FOR REDUNDANTLY STORING METADATA FOR NON-VOLATILE MEMORY

(75) Inventor: Daniel J. Post, Campbell, CA (US)

(73) Assignee: Apple Inc., Cupertino, CA (US)

( * ) Notice: Subject to any disclaimer, the term of this patent is extended or adjusted under 35 U.S.C. 154(b) by 711 days.

(21) Appl. No.: 13/015,723

(22) Filed: Jan. 28, 2011

(65) Prior Publication Data

US 2012/0198123 A1    Aug. 2, 2012

(51) Int. Cl.
*G06F 12/00*      (2006.01)
*G06F 11/14*      (2006.01)

(52) U.S. Cl.
CPC ............................. *G06F 11/1435* (2013.01)
USPC .......................................................... 711/103

(58) Field of Classification Search
CPC ................................. G06F 12/00; G06F 13/28
USPC ................................................. 711/103, 165
See application file for complete search history.

(56) References Cited

U.S. PATENT DOCUMENTS

| | | | |
|---|---|---|---|
| 6,529,997 B1 | 3/2003 | Debiez et al. | |
| 7,139,863 B1 | 11/2006 | Defouw et al. | |
| 7,366,825 B2 | 4/2008 | Williams et al. | |
| 7,389,397 B2 | 6/2008 | Paley et al. | |
| 7,676,482 B2 * | 3/2010 | Sprague et al. | 707/999.101 |
| 8,151,060 B2 | 4/2012 | Mizushima | |
| 8,171,205 B2 | 5/2012 | Royer et al. | |
| 8,341,375 B2 | 12/2012 | So et al. | |
| 2006/0039196 A1 * | 2/2006 | Gorobets et al. | 365/185.01 |
| 2006/0064539 A1 | 3/2006 | Mukaida et al. | |
| 2007/0022241 A1 | 1/2007 | Sinclair | |
| 2007/0083697 A1 | 4/2007 | Birrell et al. | |
| 2007/0136501 A1 * | 6/2007 | Chang et al. | 710/105 |
| 2007/0268905 A1 | 11/2007 | Baker et al. | |
| 2008/0010580 A1 | 1/2008 | Anderson et al. | |
| 2008/0098157 A1 | 4/2008 | Andrewartha et al. | |
| 2008/0126848 A1 | 5/2008 | Yoshida | |
| 2008/0270730 A1 | 10/2008 | Lasser et al. | |
| 2008/0288712 A1 | 11/2008 | Cornwell et al. | |
| 2008/0313416 A1 * | 12/2008 | Frondozo et al. | 711/162 |
| 2009/0100115 A1 | 4/2009 | Park et al. | |
| 2009/0109786 A1 | 4/2009 | Ye et al. | |
| 2009/0157950 A1 | 6/2009 | Selinger | |
| 2009/0157989 A1 * | 6/2009 | Karamcheti et al. | 711/156 |
| 2009/0158085 A1 | 6/2009 | Kern et al. | |
| 2009/0172262 A1 * | 7/2009 | Olbrich et al. | 711/103 |
| 2009/0172335 A1 | 7/2009 | Kulkarni et al. | |
| 2010/0217921 A1 * | 8/2010 | Mun | 711/103 |
| 2011/0072189 A1 | 3/2011 | Post et al. | |

* cited by examiner

*Primary Examiner* — April Y Blair
*Assistant Examiner* — Trang Ta
(74) *Attorney, Agent, or Firm* — Van Court & Aldridge LLP

(57) ABSTRACT

Systems and methods are provided for storing data to or reading data from a non-volatile memory ("NVM"), such as flash memory, using a metadata redundancy scheme. In some embodiments, an electronic device, which includes an NVM, may also include a memory interface for controlling access to the NVM. The memory interface may receive requests to write user data to the NVM. The user data from each request may be associated with metadata, such as a logical address, a directional flag, or other data. In response to a write request, the NVM interface may store the user data and its associated metadata in a first memory location (e.g., page), and may store a redundant copy of the metadata in a second memory location. The directional flag indicates the geometric relationship between the first memory location and the second memory location. Thus, if the first memory location becomes inaccessible, the memory interface can still recover the metadata from the backup copy stored in the second memory location.

29 Claims, 7 Drawing Sheets

SYSTEMS AND METHODS FOR REDUNDANTLY STORING METADATA FOR NON-VOLATILE MEMORY

FIELD OF THE INVENTION

This can relate to systems and methods for storing metadata in memory locations of a non-volatile memory.

BACKGROUND OF THE DISCLOSURE

NAND flash memory, as well as other types of non-volatile memory ("NVM"), is commonly used in electronic devices for mass storage. For example, consumer electronics such as portable media players often include flash memory to store music, videos, and other media.

Non-volatile memory devices, however, may develop defective memory cells through normal, everyday use, and operational memory cells may suffer from program/erase/read disturb due to voltages applied to the cell being addressed or neighboring cells. When a memory location, such as a page, of a NVM contains too many defective cells or otherwise becomes unusable from excessive errors, the information contained within that memory location may be lost. When this occurs, the electronic device using the NVM might lose user data (e.g., data stored by an application). In addition, the electronic device might lose metadata that the electronic device uses to manage the NVM. This can have a negative affect on the performance of the non-volatile memory.

In some circumstances, there have been attempts at protecting the metadata by storing redundant copies of it in a location other than where the user data is stored. For example, U.S. patent application Ser. No. 12/562,860, which is incorporated by reference herein in its entirety, describes systems and methods for utilizing redundantly stored metadata in which all of the redundant metadata would be stored in a similar manner, such as the "left-of-me" method. While those attempts may have had some measure of success, they become less reliable and more prone to error when the user data in question is located close to periphery of the organizational structure of the memory device. For example, if the user data is stored close to or at the end of a superblock, or such that it crosses a superblock boundary, there is a strong likelihood that the redundant metadata will be lost (e.g., they may not be a cell to the right of the one in which the user data is stored).

SUMMARY OF THE DISCLOSURE

Accordingly, systems and methods are disclosed for providing metadata redundancy in a non-volatile memory ("NVM"). The redundant metadata may include a logical address, for example, which may be used to enable the recovery of metadata when one or more memory locations of the NVM becomes defective or suffers from other error-causing phenomena, such as disturb defects.

In some embodiments, an electronic device is provided that may include a system-on-a-chip ("SoC") and an NVM. The NVM may include flash memory, such as NAND flash memory, or any other suitable type of non-volatile memory.

The system-on-a-chip can include an NVM interface, sometimes referred to herein as a "memory interface," for accessing the NVM. In some embodiments, the memory interface may receive write requests from a file system to store user data at a logical address. The memory interface may map the logical address to a physical address and may store the user data at the physical address of the NVM.

The memory interface may store metadata associated with the user data at the physical address in which the user data is stored. The metadata may include the logical address or any other information generated by the memory interface for use in managing the NVM. The memory interface may additionally store redundant copies of the metadata at one or more other physical addresses. It may be advantageous to store the redundant copies in close proximity to the data itself. For example, the memory interface may save the metadata in a buffer, and may program the metadata to another physical address which is adjacent to the page being written in response to a second, subsequent write request from the file system. It may be even more beneficial to store the redundant metadata in a page that is diagonally adjacent to the page being written to further protect the metadata from being lost from a failure or error.

In some embodiments, a flag could be utilized to indicate which direction the metadata was stored. For example, the flag could be set to a number that could vary from one to eight to indicate which adjacent page the redundant data was stored. "One" could be used to indicate the adjacent page above and to the left of the page being written, while "four" could indicate the adjacent page directly to the right of the page being written (in this manner, the sequence would continue clockwise starting with one and ending with eight denoting the page to the left of the page being written). In embodiments where a flag is utilized to indicate where the redundant metadata is to be stored, each individual redundant metadata cell can be stored in a different direction from the user data cell, as is appropriate. For example, if the user data occupies the last cell in a superblock (i.e., the lower right corner cell), the redundant metadata could be stored in any one of the cells that corresponds to a flag setting of 8, 1 or 2 (respectively, the left, upper left or above cell).

Using this approach, the metadata for the user data can be stored at multiple locations in the NVM, and the memory interface can recover the metadata from another location if the physical address at which the user data is stored becomes inaccessible (e.g., due to read/program/erase disturb, defects, or other error-causing phenomena). For example, in response to determining that data read from a first page is not usable, the NVM interface may read a second page that also contains the metadata for the user data stored at the first page, and may extract the metadata from the second page.

To ensure that the same piece of metadata can be read from multiple locations, at least some of the memory locations of a NVM may each be used to store multiple copies of metadata. The different copies of metadata stored at a particular memory location may be associated with different user data stored at different memory locations of the NVM. For example, one piece of metadata in a current memory location may be associated with user data that is also stored at the current memory location. Another piece of metadata in the current memory location, sometimes referred to as the "redundant metadata," may be associated with user data stored at another memory location (e.g., from a previous write request).

In some embodiments, the other memory location (e.g., from the previous write request) may have a particular geometric relationship or mapping with respect to the current memory location, as described above. For example, the redundant metadata stored at a current page may be associated with user data stored in a previous page in the same block (i.e., "above-me" redundancy). As another example, the redundant metadata may be associated with user data stored in a corresponding page of a previous block of the same super block (i.e., "left-of-me" redundancy). As still another example, the redundant metadata may be associated with user data stored in a previous page of a previous block (i.e., "diagonal-to-me" redundancy). And in the diagonal configurations, there are four possible different directions that can be utilized in order to remain adjacent to the cell containing the user data. Thus, in accordance with various embodiments disclosed herein, a single memory device may utilize multiple different location schemes for redundant metadata, which can increase the overall performance of the device.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Figure 1:
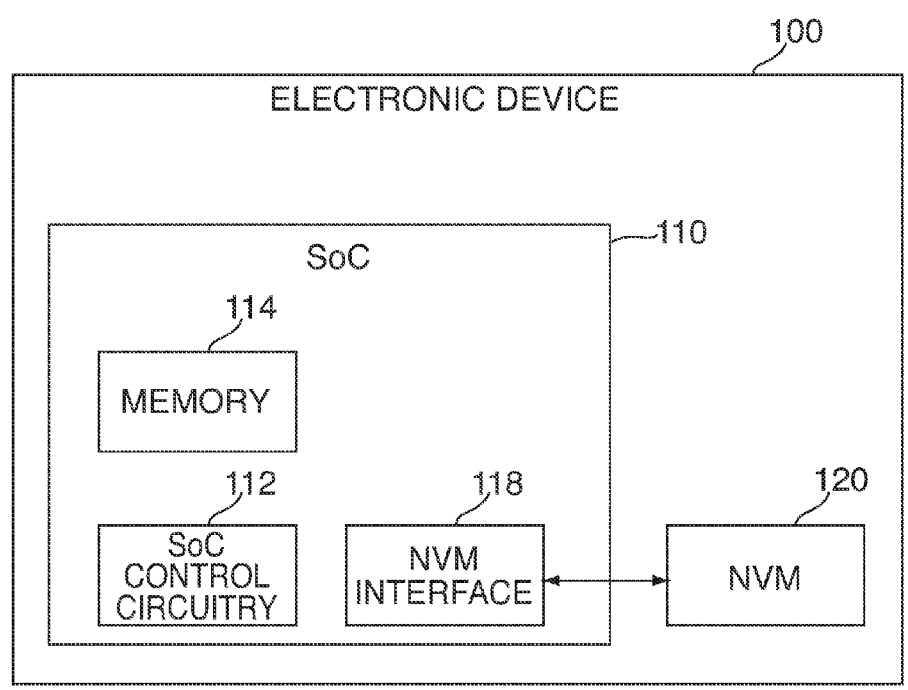
FIGS. 1 and 2 are schematic views of electronic devices configured in accordance with various embodiments of the invention.

FIG. 1 is a schematic view of electronic device 100. In some embodiments, electronic device 100 can be or can include a portable media player (e.g., an iPod™ made available by Apple Inc. of Cupertino, Calif.), a cellular telephone (e.g., an iPhone™ made available by Apple Inc.), a pocket-sized personal computer, a personal digital assistance ("PDA"), a desktop computer, a laptop computer, a digital camera and/or any other suitable type of electronic device.

Electronic device 100 can include system-on-a-chip ("SoC") 110 and non-volatile memory ("NVM") 120. Non-volatile memory 120 can include a NAND flash memory based on floating gate or charge trapping technology, NOR flash memory, erasable programmable read only memory ("EPROM"), electrically erasable programmable read only memory ("EEPROM"), ferroelectric RAM ("FRAM"), magnetoresistive RAM ("MRAM"), any other known or future types of non-volatile memory technology, or any combination thereof. NVM 120 can be organized into "blocks," which are the smallest units of erase, and further organized into "pages," which are the smallest programmable and readable units. In some embodiments, NVM 120 can include multiple integrated circuits, where each integrated circuit may have multiple blocks. The blocks from corresponding integrated circuits (e.g., blocks having the same position or block number) may form "super blocks." Each memory location (e.g., page or block) of NVM 120 can be addressed using a physical address (e.g., a physical page address or physical block address).

FIG. 1, as well as later figures and various disclosed embodiments, may sometimes be described in terms of using flash technology. However, this is not intended to be limiting, and any other type of non-volatile memory can be implemented instead. Electronic device 100 can include other components, such as a power supply or any user input or output components, which are not depicted in FIG. 1 to prevent overcomplicating the figure.

System-on-a-chip 110 can include SoC control circuitry 112, memory 114, and NVM interface 118. SoC control circuitry 112 can control the general operations and functions of SoC 110 and the other components of SoC 110 or device 100. For example, responsive to user inputs and/or the instructions of an application or operating system, SoC control circuitry 112 can issue read or write commands to NVM interface 118 to obtain data from or store data in NVM 120. For clarity, data that SoC control circuitry 112 may request for storage or retrieval may be referred to as "user data," even though the data may not be directly associated with a user or user application. Rather, the user data can be any suitable sequence of digital information generated or obtained by SoC control circuitry 112 (e.g., via an application or operating system).

SoC control circuitry 112 can include any combination of hardware, software, and firmware, and any components, circuitry, or logic operative to drive the functionality of electronic device 100. For example, SoC control circuitry 112 can include one or more processors that operate under the control of software/firmware stored in NVM 120 or memory 114.

Memory 114 can include any suitable type of volatile or non-volatile memory, such as dynamic random access memory ("DRAM"), synchronous dynamic random access memory ("SDRAM"), double-data-rate ("DDR") RAM, cache memory, read-only memory ("ROM"), or any combination thereof. Memory 114 can include a data source that can temporarily store user data for programming into or reading from non-volatile memory 120. In some embodiments, memory 114 may act as the main memory for any processors implemented as part of SoC control circuitry 112.

NVM interface 118 may include any suitable combination of hardware, software, and/or firmware configured to act as an interface or driver between SoC control circuitry 112 and NVM 120. For any software modules included in NVM interface 118, corresponding program code may be stored in NVM 120 or memory 114.

NVM interface 118 can perform a variety of functions that allow SoC control circuitry 112 to access NVM 120 and to manage the memory locations (e.g., pages, blocks, super blocks, integrated circuits) of NVM 120 and the data stored therein (e.g., user data). For example, NVM interface 118 can interpret the read or write commands from SoC control circuitry 112, perform wear leveling, and generate read and program instructions compatible with the bus protocol of NVM 120. NVM interface 118 can also instruct device 100 to utilize redundant metadata, and can provide instructions and/or commands control the redundant metadata (or those instructions can come from SoC control circuitry 112).

While NVM interface 118 and SoC control circuitry 112 are shown as separate modules, this is intended only to simplify the description of the various embodiments disclosed herein. It should be understood that these modules may share hardware components, software components, or both. For example, a processor implemented as part of SoC control circuitry 112 may execute a software-based memory driver for NVM interface 118. Accordingly, portions of SoC control circuitry 112 and NVM interface 118 may sometimes be referred to collectively as "control circuitry."

FIG. 1 illustrates an electronic device where NVM 120 may not have its own controller. In other embodiments, electronic device 100 can include a target device, such as a flash or SD card, that includes NVM 120 and some or all portions of NVM interface 118 (e.g., a translation layer, as discussed below). In these embodiments, SoC 110 or SoC control circuitry 112 may act as the host controller for the target device. For example, as the host controller, SoC 110 can issue read and write requests to the target device.

Figure 2:
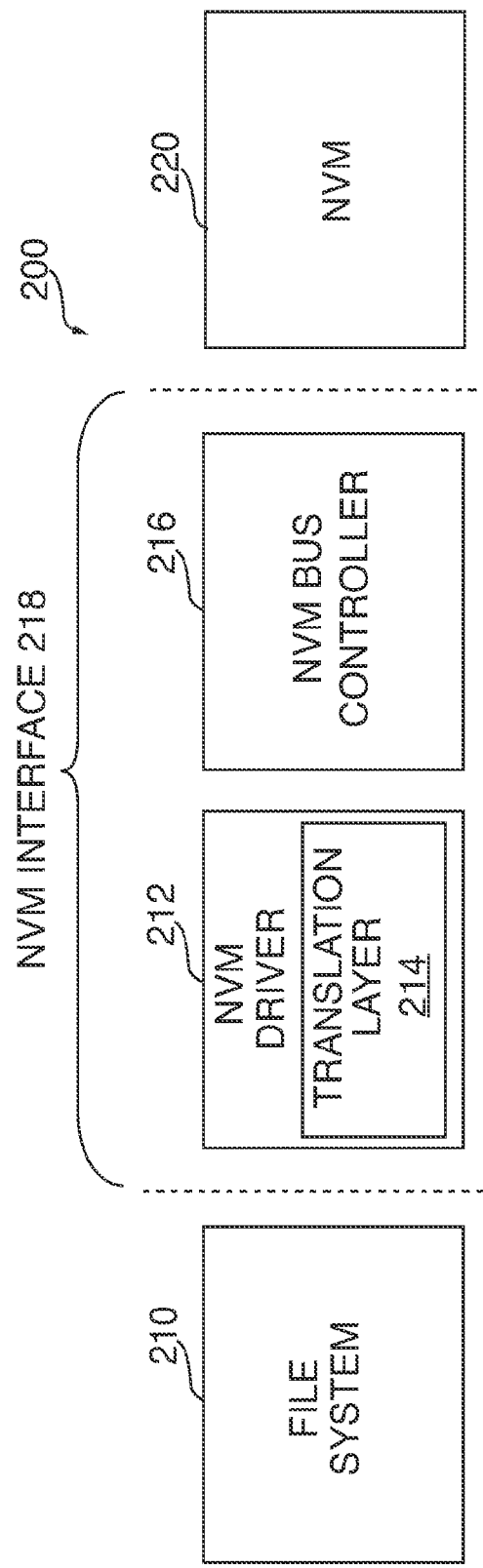

FIG. 2 is a schematic view of electronic device 200, which may illustrate in greater detail some of the firmware, software and/or hardware components of electronic device 100 (FIG. 1) in accordance with various embodiments. Electronic device 200 may have any of the features and functionalities described above in connection with FIG. 1, and vice versa. Electronic device 200 can include file system 210, NVM driver 212, NVM bus controller 216, and NVM 220. In some embodiments, file system 210 and NVM driver 212 may be software or firmware modules, and NVM bus controller 216 and NVM 220 may be hardware modules. Accordingly, in these embodiments, NVM driver 212 may represent the software or firmware aspect of NVM interface 218, and NVM bus controller 216 may represent the hardware aspect of NVM interface 218.

File system 210 can include any suitable type of file system, such as a File Allocation Table ("FAT") file system, and may be part of the operating system of electronic device 200 (e.g., part of SoC control circuitry 112 of FIG. 1). In these embodiments, file system 210 may perform some or all of the functionalities of NVM driver 212 discussed below, and therefore file system 210 and NVM driver 212 may or may not be separate modules.

File system 210 may manage file and folder structures for the application and operating system. File system 210 may operate under the control of an application or operating system running on electronic device 200, and may provide write and read commands to NVM driver 212 when the application or operating system requests that information be read from or stored in NVM 220. Along with each read or write command, file system 210 can provide a logical address to indicate where the user data should be read from or written to, such as a logical page address or a logical block address with a page offset.

File system 210 may provide read and write requests to NVM driver 212 that are not directly compatible with NVM 220. For example, the logical addresses may use conventions or protocols typical of hard-drive-based systems. A hard-drive-based system, unlike flash memory, can overwrite a memory location without first performing a block erase. Moreover, hard drives may not need wear leveling to increase the lifespan of the device. Therefore, NVM interface 218 can perform any functions that are memory-specific, vendor-specific, or both to handle file system requests and perform other management functions in a manner suitable for NVM 220.

NVM driver 212 can include translation layer 214. In some embodiments, translation layer 214 may be or include a flash translation layer ("FTL"). On a write operation, translation layer 214 can map the provided logical address to a free, erased physical location on NVM 220. On a read operation, translation layer 214 can use the provided logical address to determine the physical address at which the requested data is stored. Because each NVM may have a different layout depending on the size or vendor of the NVM, this mapping operation may be memory and/or vendor specific. Translation layer 214 can perform any other suitable functions in addition to logical-to-physical address mapping. For example, translation layer 214 can perform any of the other functions that may be typical of flash translation layers, such as garbage collection and wear leveling.

NVM driver 212 may interface with NVM bus controller 216 to complete NVM access requests (e.g., program, read, and erase requests). Bus controller 216 may act as the hardware interface to NVM 220, and can communicate with NVM 220 using the bus protocol, data rate, and other specifications of NVM 220.

NVM interface 218 can manage the operations of NVM 220 based on memory management data, sometimes referred to herein as "metadata." The metadata may be generated by NVM driver 212 or it may be generated by a module operating under the control of NVM driver 212. For example, the metadata can include any information used for managing the mapping between logical and physical addresses, bad block management, wear leveling, error correcting code ("ECC") data, or any combination thereof. The metadata may include data provided by file system 210 along with some portion of the user data, such as a logical address. Thus, in general, "metadata" may refer to any information about or relating to the user data or information that is used generally to manage the operation and memory locations of a non-volatile memory.

NVM interface 218 may be configured to store metadata in NVM 220. In some embodiments, NVM interface 218 may store metadata associated with user data at the same memory location (e.g., page) in which the user data is stored. For example, NVM interface 218 may store user data, the associated logical address, and ECC data for the user data at one memory location of NVM 220. NVM interface 218 may also store other types of metadata about the user data in the same memory location. NVM interface 218 may, in accordance with some embodiments, also be configured to store one or more redundant copies of metadata for given user data in a page or block in which that given user data is not located, such as an adjacent page or block (as set forth in more detail below).

NVM interface 218 may store the logical address so that, on power-up of NVM 220 or during operation of NVM 220, electronic device 200 can determine what data resides at that location. In particular, because file system 210 may reference the user data according to its logical address and not its physical address, NVM interface 218 may store the user data and logical address together to maintain their association. This way, even if a separate table maintaining the physical-to-logical mapping in NVM 220 becomes outdated, NVM interface 218 may still determine the proper mapping at power-up or reboot of electronic device 200, for example.

However, a memory location of NVM 220 may become unreadable due to disturb effects from neighboring locations, defects, failed read operations, or due to some other error-causing phenomena. When this occurs, NVM interface 218 may not only lose the actual user data at that memory location, but NVM interface 218 may no longer be able to determine what kind of information was supposed to be stored at that memory location (e.g., may no longer be able to determine the logical address associated with the user data). In other words, NVM interface 218 may lose any information about the user data or any information that NVM interface 218 needs to manage the user data stored at that memory location. This can occur especially during power-up of electronic device 200 when NVM interface 118 may attempt to determine the logical-to-physical address mapping of NVM 220.

In order to alleviate the consequences of losing data stored at a current memory location, and in accordance with some embodiments, NVM interface 218 may store the current location's metadata in a number of other memory locations, sometimes referred to as "backup" or redundant memory locations. In particular, the backup memory locations may not be completely filled with user data and metadata from another write request. Therefore, at least some of the remaining space in the backup memory locations may be used to store the current memory location's metadata. As discussed above, this metadata may be referred to as "redundant metadata." Even though NVM interface 218 may not be able to retrieve the user data itself when the current memory location becomes inaccessible, NVM interface 218 may still be able to recover the metadata for that user data. Using the redundant metadata, NVM interface 218 may be more capable of handling the loss of user data at the current memory location, thereby reducing and/or minimizing the impact on the user.

In some embodiments, NVM interface 218 may use the redundant metadata to recover an older copy of the lost user data. For example, the redundant metadata may include a logical address for the lost user data, and NVM interface 218 may search through various memory locations of NVM 220 to find another memory location, which may be marked with an older age or previous generation, that stores the same logical address. This way, even though NVM interface 218 may not be able to recover the actual, current user data when a memory location becomes inaccessible, NVM interface 218 may still be able to recover an older version of the user data (which may be close to, or the same as, the damaged user data).

In some embodiments, NVM interface 218 may look up redundant metadata from a backup memory location, such as to assist in power-up scans, during garbage collection, wear leveling operations, and/or read disturb relocation operations. For example, at runtime, if NVM interface 218 cannot recover the data stored in a current memory location (e.g., due to disturb effects), NVM interface 218 may obtain the metadata from a backup memory location, thereby avoiding the need to perform a resource-intensive, exhaustive search on a separate table. Also, by storing redundant metadata at backup memory locations containing other user data, a second set of tables for the address map may not be needed.

NVM interface 218 may choose any suitable memory location to store redundant copies of the metadata. The memory locations may be chosen such that there is a one-to-one mapping between the location with the redundant copy and the location with the original metadata and its associated user data. In other words, NVM interface 218 may use any suitable scheme to select a backup memory location as long as there is no ambiguity as to which memory location the backup memory location is backing up. In accordance with some embodiments, it may be advantageous to store the redundant metadata in a location that is adjacent to the location where the actual user data is stored. This would enable the use of simple flags to identify the location of the original user data that corresponds to the redundant metadata. In accordance with other embodiments, advantages may be obtained by limiting the location of the redundant metadata to locations that are diagonally adjacent to the location where the actual user data is stored. In such instances, there may be less likely a chance that errors would occur to the diagonally adjacent locations versus the locations that are directly to the left/right/up/down of the current location in which user data is being accessed.

Figure 3:
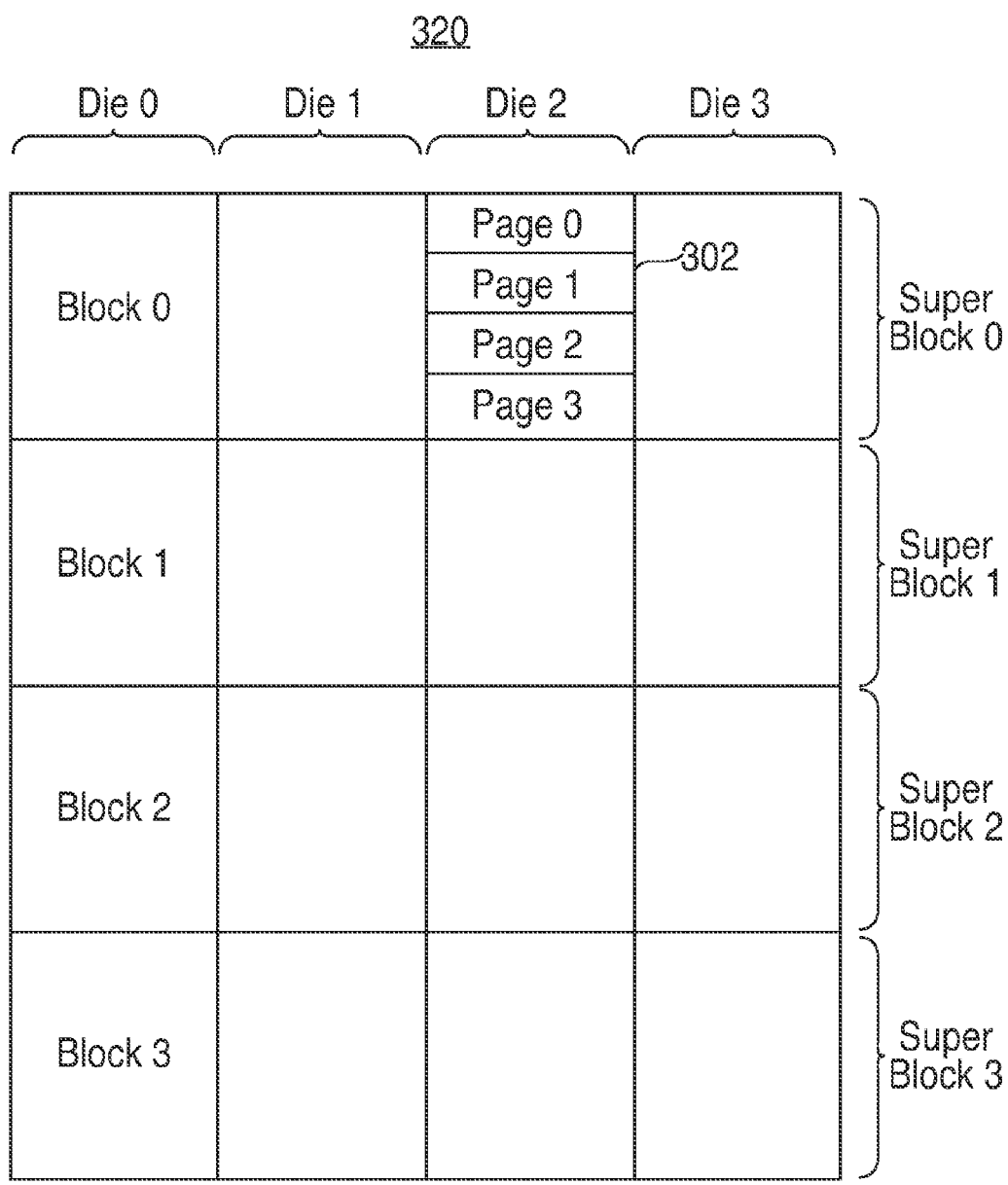
FIG. 3 is a functional view of a non-volatile memory in accordance with some embodiments of the invention.

As mentioned above, a non-volatile memory device (e.g., NVM 120 of FIG. 1), can be organized into dies, blocks, pages, super blocks, and the like. For example, FIG. 3 shows a schematic layout of NVM 320. FIG. 3 is merely meant to illustrate one potential manner in which the organizational layout of NVM 320 can be established, and is not meant to indicate an actual, physical layout of the non-volatile memory device itself. For example, although die 0 is illustrated as being directly to the left of die 1 in FIG. 3, this is merely to illustrate the functional relationship of those two dies. In the actual physical configuration of NVM 320, dies 0 and 1 may or may not be physically located near one another. Moreover, although a certain number of dies, blocks, and pages are shown in FIG. 3, this, again, is merely for the purpose of illustration and one skilled in the art will appreciate that NVM 320 could include any suitable number of dies, blocks, and pages. In one instance, each die of NVM 320 can include 4096 blocks, each block may include 64, 128, or 192 pages based on whether the block is a single level cell ("SLC") block, a 2-bit multi-level cell ("MLC") block, or a 3-bit MLC block, and each page can include 512 bytes. Each of these parameters, namely, number of blocks, pages per block, and bytes per page, can be varied as required by each specific implementation without departing from the spirit of what is disclosed herein.

As illustrated by FIG. 3, NVM 320 can include one or more dies (i.e., integrated circuits), such as die 0, die 1, die 2, and die 3 (as well as others which are not shown). Each die may then be logically divided into one or more "blocks." For example, die 0 is illustrated as being organized into blocks 0-3. During an erase command of NVM 320, an entire block of memory may be erased at once. Each block of the dies may then itself be subdivided into one or more pages, such that a given number of pages equals one block. For example, block 0 of die 2 (labeled as block 302 in FIG. 3), is illustrated as being organized into four pages that are numbered 0, 1, 2 and 3. During a read or write command of NVM 320, a full page may be read or written at once, respectively. NVM 320 can also include one or more super blocks that include one block from each die that has the same position or "block number" in the die. For example, super block 0 of NVM 320 can include the block 0 for each of dies 0-3 (and thus, would include block 302). Similarly, super block 1 of NVM 320 would then include the block 1 for each of dies 0-3; super block 2 of NVM 320 would then include the block 2 for each of dies 0-3, and so forth.

Superblocks can be formed by virtually linking together one or more blocks. While FIG. 3 shows superblocks being aligned with the same block number for each die, that is for illustrative purposes only. Blocks do need not be in the same row of each die to be virtually linked as a superblock. In fact, blocks may be chosen randomly from two or more dies to form a superblock (thus, a superblock could be formed from dies 0, 1 and 3, without the inclusion of a block from die 2 or any other die). Superblocks provide operational parallelism, thereby enabling programming, reading, and erase operations to be performed on blocks located in different dies in parallel. In another embodiment and in a similar manner, pages from two or more dies may be virtually linked together to form superpages. Moreover, in some embodiments, a superblock can include only one block. A translation layer being implemented in an NVM interface may be used to keep track of superblocks and/or superpages.

Each page of NVM 320 can include any suitable information. For example, the pages can include user data, metadata or both. In some embodiments, metadata such as ECC data can be included in the pages to provide for error detection and/or correction of the information stored in NVM 320. The inclusion of metadata can include metadata corresponding to the user data located within that page (or whatever unit of organization is used, such as block, superblock, or even down to the individual memory cells), metadata corresponding to other user data, metadata corresponding to both local and non-local user data, or even including multiple instances of metadata which correspond to different instances of user data (i.e., where a single memory location stores redundant metadata for more than one non-local memory location).

In some embodiments, the memory locations chosen as backup memory locations may have a particular position in NVM relative to the memory location with the user data. For example, the backup memory location may be the next page of the NVM in a sequence of pages in a block, a corresponding page in the next block of a super block (e.g., a page with the same position or page number in its respective block), a corresponding page in a block of a different superblock, or a corresponding page in the next block of the same integrated circuit. For simplicity, the blocks and pages of the NVM may be represented graphically in two-dimensional or three-dimensional space so that the relationship between two memory locations can be viewed as having a particular geometric relationship with one another. In other words, as illustrated in FIG. 4, using the graphical representation, terms such as "left," "right," "above," "below," and "diagonal" may be used.

Figure 4:
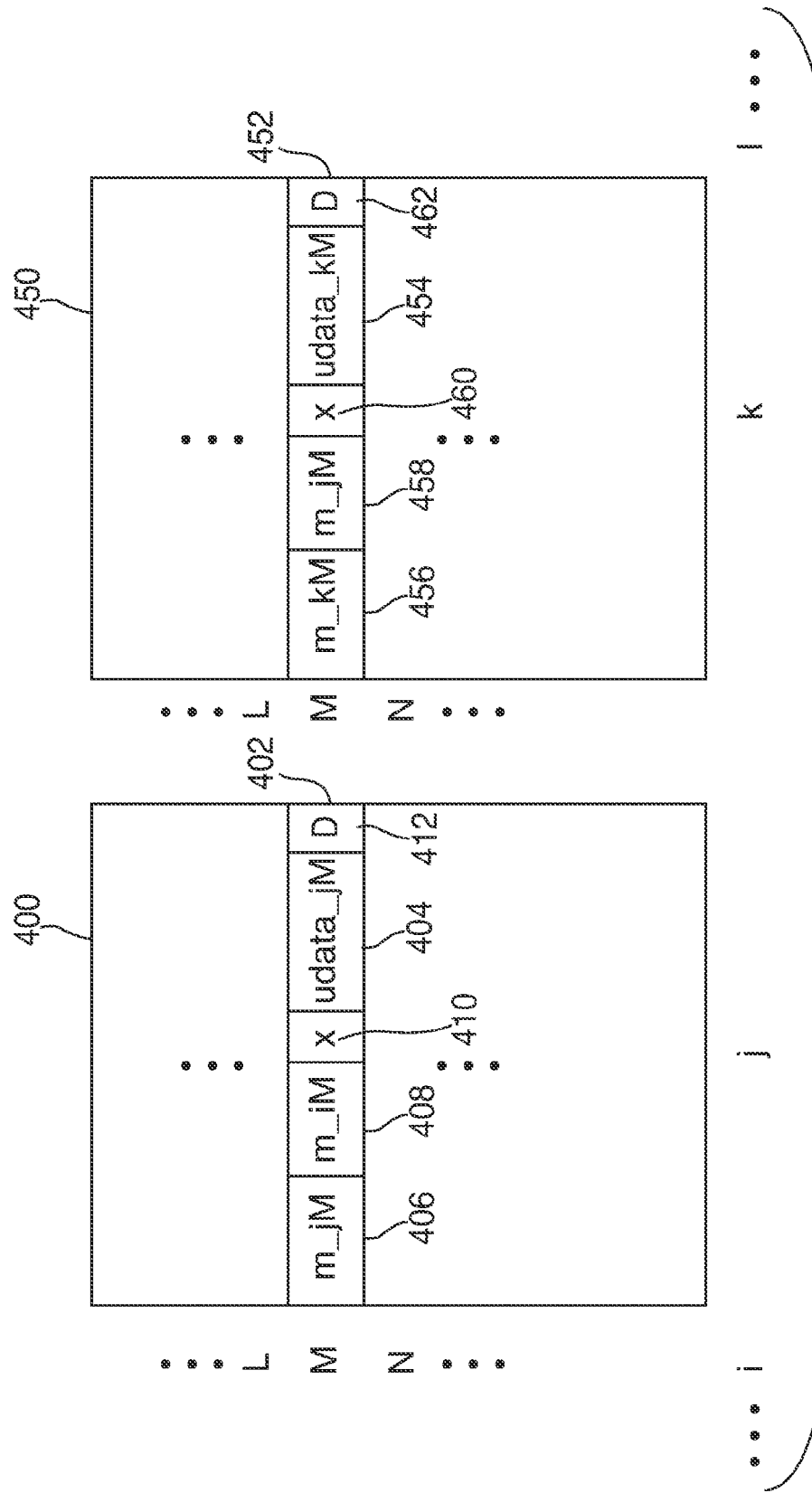
FIG. 4 is a graphical view of two blocks of a non-volatile memory, which illustrates a redundancy metadata scheme, in accordance with various embodiments of the invention.

Referring now to FIG. 4, a graphical view of various pages and blocks of non-volatile memory 220 (FIG. 2) is shown in accordance with various metadata redundancy schemes. In particular, FIG. 4 illustrates a metadata redundancy scheme which has previously referred to as "left-of-me" redundancy, with additional modifications in accordance with various embodiments disclosed herein. For clarity, in FIG. 4 and elsewhere in this disclosure, the following naming conventions may be used: udata_xy may refer to user data stored at block x, page y, and m_xy may refer to metadata associated with the user data stored at block x, page y.

Turning to FIG. 4, a graphical view of blocks 400 and 450 are shown, which may be used to illustrate left-of-me metadata redundancy (as well as additional aspects of embodiments disclosed herein). In some embodiments, blocks 400 and 450 may have any suitable adjacent positions j and k in a sequence of blocks in the same super block, where position k is to the "right," "above," "below," or in any one of 4 diagonal positions with respect to position j. That is, blocks 400 and 450 may have corresponding positions in any of the neighboring units within NVW 220, such as superblocks or different integrated circuits within NVM 220. In other embodiments, blocks 400 and 450 may have any suitable adjacent positions j and k in a sequence of blocks in the same integrated circuit.

Blocks 400 and 450 may each include a number of pages, including pages 402 and 452, respectively. Pages 402 and 452 may be located at the same position M in their respective blocks, where position M can be located at any suitable location along blocks 400 and 450. Thus, page 402 may be directly to the "left" of page 452.

Page 402 of block 400 may include a data portion 404 for storing user data (i.e., udata_jM), a first metadata portion 406 for storing metadata associated with that user data (i.e., m_jM, such as a logical address), and one or more additional metadata portions 408 and 410 (where 410 may embody one or more additional instances of portion 408, depending on how many redundant data portions are included) for storing redundant metadata. In addition, page 402 may also include a directional field 412, which indicates the direction of the adjacent memory cell where the redundant copy of the metadata will be stored. Similarly, page 452 of block 450 can include data portion 454, first metadata portion 456, and additional metadata portions 458 and 460 (where portion 460 is substantially similar to portion 410 described above), as well as directional field 462.

If a left-of-me redundancy scheme were exclusively utilized, some or all of the pages of NVM 220 may store redundant metadata associated with the user data from a corresponding page in a previous block (i.e., the page to the "left" of the current page). For example, page 452 may use its second metadata portion 458 to store a redundant copy of the metadata from first metadata portion 406 of page 402, and page 402 may use its second metadata portion 408 to store a redundant copy of the metadata from a page to the left of page 402 (i.e., at position I, which is not shown in FIG. 4). This way, for example, the metadata for udata_jM of page 402 may be stored in at least two locations (i.e., first metadata portion 406 of page 402 and second metadata portion 458 of page 452), and if page 402 becomes unreadable for any reason, the metadata for udata_jM may still be recovered from page 452.

Instead of exclusively utilizing a left-of-me redundancy scheme (or any single directional scheme), however, further improvements in performance and reliability may be achieved by storing redundant metadata in a different direction depending on the circumstances. In this manner, each of the pages would have at least one location in which to store a redundant copy of metadata, regardless of whether they were located on the edge of a block or superblock, or within the body of the block or superblock. The potential issue may be illustrated by looking at page 452. If page 452 is located within the body of block 450, then the left-of-me scheme should be sufficient. If, however, page 452 is on the right edge of block 450, such that there is no other page to the right of page 452, then the left-of-me scheme could potentially fail to provide a place to store the redundant metadata for page 452.

In some embodiments, this potential issue is addressed by utilizing multiple redundant storage schemes in a single memory device. For example, page 402 could utilize a left-of-me redundancy storage scheme, while page 452 utilizes a right-of-me storage scheme. Under such circumstances, the redundant metadata for page 452 would be stored at additional portion 410 in page 402 (so that page 402 could still store the metadata for the page to the left of 402 in portion 406). In each instance, directional fields 412 and 462 can be utilized to indicate where the redundant metadata is to be stored. The values in the directional fields could be established as part of the manufacturing process such that the NVM controller would not have to determine where to store the redundant metadata, thereby improving processing efficiency.

In accordance with some embodiments, it may also be advantageous to store metadata in locations that are not adjacent to the memory cells where the user data is stored. Under those circumstances, directional field D (e.g., fields 412 and 462, as shown in FIG. 4), would include an additional value that is indicative of how far the redundant metadata will be stored from the current user data location. For example, directional field 412 could include two values such as "8" to indicate a left direction (in the manner described above using numerals 1-8, where 1 refers to up and to the left), and "5" to indicate that the redundant metadata would be stored five pages away.

Figure 5:
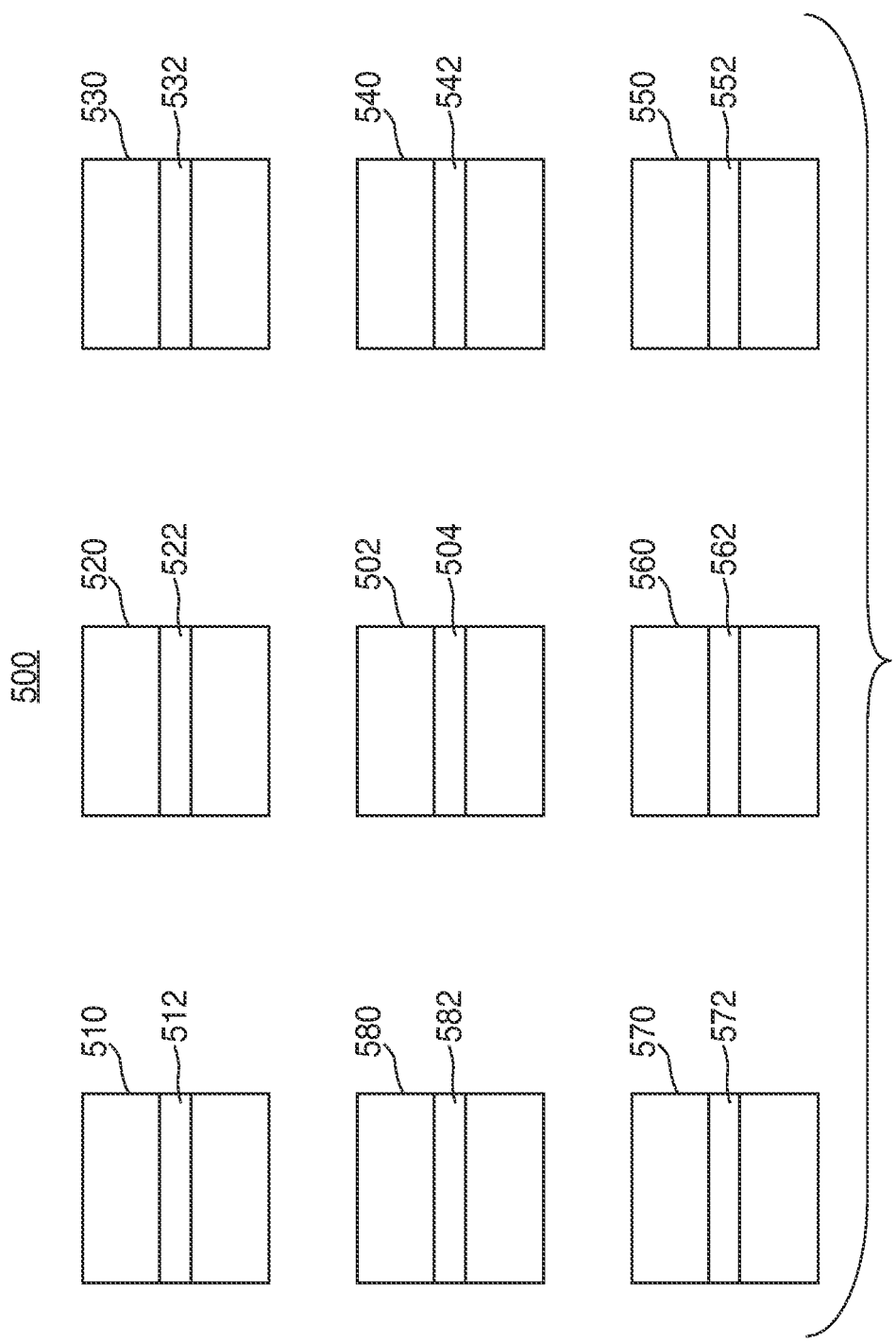
FIG. 5 is a graphical view of multiple blocks of a non-volatile memory, which illustrates the use of directional information for storing redundant metadata, in accordance with various embodiments of the invention.

FIG. 5 shows a schematic diagram of a sample set of memory blocks and pages that may illustrate the use of the directional field described above. Memory device 500 includes at least nine blocks that, in this instance, are labeled 502 (one block) and 510-580 (eight blocks). The second digit of the reference numeral for each of blocks 510-580 corresponds with the directional numbers 1-8 discussed above.

Thus, upper left block 510 refers to upper left number "1" and left block 580 refers to left number "8," etc. Each block includes at least one page, which are labeled 504 and 512-582, respectively. When the redundant metadata for page 504 is stored in one of blocks 510-580, the directional field within page 504 would be updated with the middle digit of the page where it was written to indicate the direction.

Figure 6:
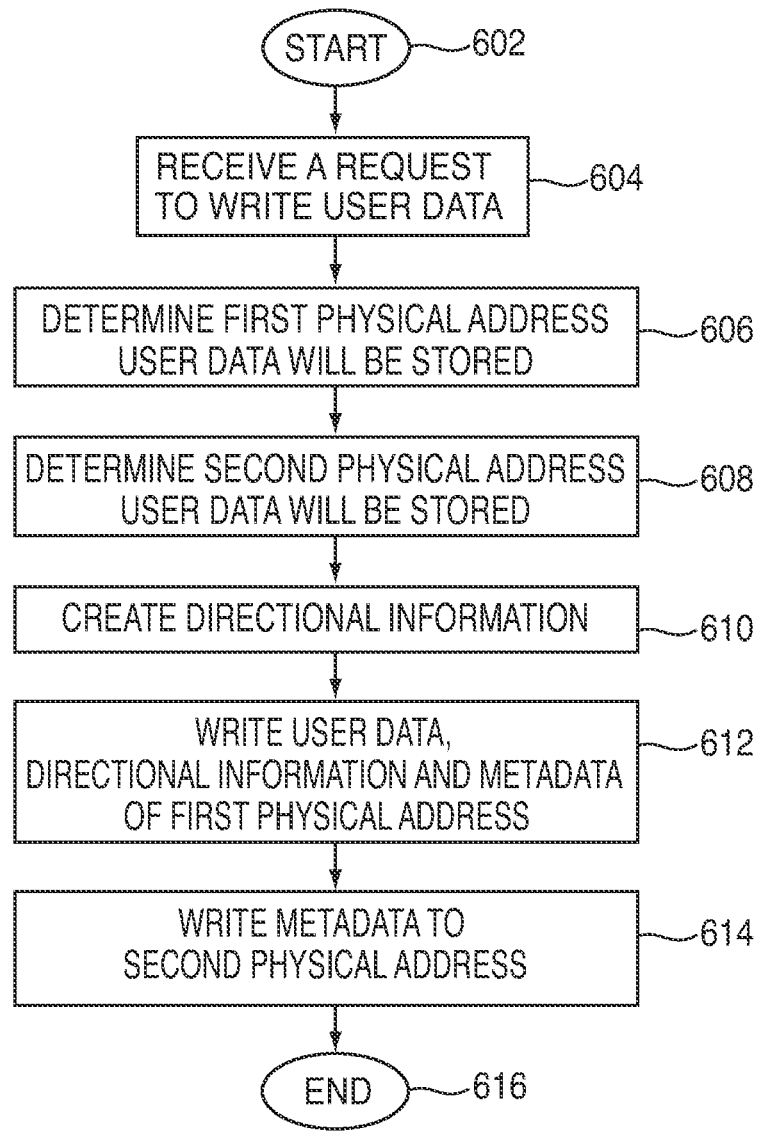
FIG. 6 is a flowchart of an illustrative process for storing user data using a metadata redundancy scheme in accordance with various embodiments of the invention.
Figure 7:
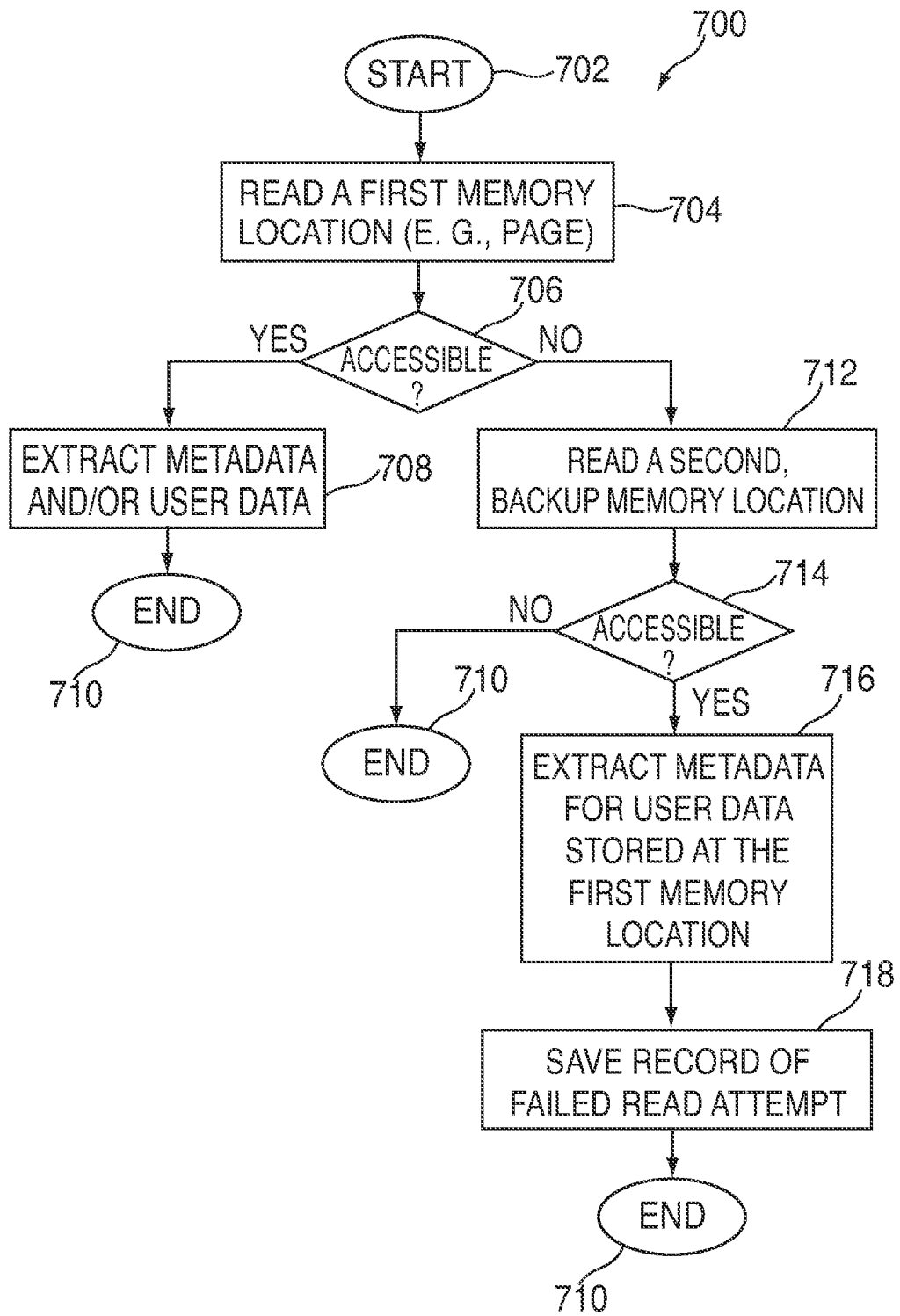
FIG. 7 is a flowchart of an illustrative process for recovering metadata when a metadata redundancy scheme is employed in accordance with various embodiments of the invention.

Now Referring now to FIGS. 6 and 7, flowcharts of illustrative processes 600 and 700 are shown in accordance with various embodiments of the invention. Processes 600 and 700 may be executed by any suitable memory interface, such as NVM interface 118 or 218 of FIGS. 1 and 2, respectively, to employ a metadata redundancy scheme.

Turning first to FIG. 6, process 600 may illustrate steps used to store redundant metadata in one or more memory locations (e.g., pages) of a non-volatile memory, such as a flash memory. Process 600 may begin at step 602. At step 604, the memory interface may receive a request to write user data to the NVM. The write request can include a first logical address at which to store the user data.

Then, at step 606, the memory interface may determine the first physical address where the user data will be stored. The physical address will also have a corresponding logical address, which is part of a mapping scheme used by the memory device for organization and efficiency. At some time, metadata corresponding to the user data is created. That metadata may include, for example, the logical address where the user data is going to be stored.

Then, in step 608, the physical address for the storage of a redundant copy of the metadata is determined. This may occur soon after the write request is made, or it may be delayed until another write request for additional user data is made, in which case the redundant metadata and the additional user data could be written in a page during a single write operation. In the meantime, the redundant metadata could be stored in a buffer, for example. Once the location for the redundant metadata is determined, directional information related to the physical location of the user data and redundant metadata can be determined in step 610.

Continuing to step 612, the memory interface causes the user data, directional information and one copy of the metadata to be written at the first physical address. At step 614, redundant copy of the metadata would be written at the second physical address. This would likely occur when additional user data is also being written at the second physical address during step 614, so that greater efficiency can be obtained by the system (e.g., then less write commands would need to be executed).

Process 600 may then end at step 616. Alternatively, process 600 may move back to step 604, where the memory interface may receive additional write requests for processing. In some embodiments, the additional write requests may lead the memory interface to read the first metadata, which was stored at step 612 during the previous iteration of process 600. In these embodiments, the memory interface may store the first metadata as the redundant metadata in step 612 of the current iteration.

Referring now to FIG. 7, a flowchart of illustrative process 700 is shown for recovering metadata when a metadata redundancy scheme is employed. Process 700 may illustrate the steps that a memory interface may execute when performing a read operation on a non-volatile memory.

Process 700 may begin at step 702. At step 704, the memory interface may read a first memory location (e.g., a first page) of the non-volatile memory. At step 706, the memory interface may determine whether the first memory location is accessible. For example, the memory interface may determine whether data read from the first memory location contains too many errors and cannot be interpreted. In these embodiments, the memory interface can apply error detection/correction to the data and may determine whether error correction can produce a valid codeword. As another example, the memory interface may determine whether the read operation itself failed, and that the NVM returned a "no-access" vector signaling this occurrence.

If, at step 706, the memory interface determines that the data at the first memory location is accessible, process 700 may move to step 708. At step 708, the memory interface can extract the metadata and/or the user data from the data read from the first memory location. Process 700 may then end at step 710.

Returning to step 706, if the memory interface determines instead that access to the first memory location (e.g., page) failed, process 700 may move to step 712. The steps along this branch of process 700 may enable the memory interface to recover metadata associated with the user data at the first memory location even if the user data at that location may not be recoverable.

At step 712, the memory interface may read a second, backup memory location. The second memory location may be selected based on its position in the non-volatile memory relative to the first memory location. For example, if left-of-me redundancy is employed, at step 712 the memory interface can read the memory location to the right of the first memory location (i.e., the corresponding page in the next block of the super block).

Then, at step 714, the memory interface may determine whether the second memory location is accessible. For example, as discussed above in connection with step 706, the memory interface may determine whether data read from the memory location contains too many errors, or the memory interface may determine whether the read operation itself failed. If, at step 714, the memory interface determines that the data from the second memory location is inaccessible, process 700 may end at step 710 without recovering the metadata for the user data at the first memory location. In other embodiments, if the employed metadata redundancy scheme stores metadata in more than two locations (i.e., in more than just the first and second memory locations), the memory interface may attempt to recover metadata by reading a second backup memory location (e.g., at a step similar to step 712).

Returning to step 714, if the memory interface determines that data at the second memory location is accessible, process 700 may continue to step 716. At step 716, the memory interface can extract, from the data read from the second memory address, metadata for user data stored at the first memory location. Then, at step 718, the memory interface can store a record of the failed read attempt from step 704. For example, the extracted metadata can include data indicative of a redundant logical address, and the memory interface can store a record that the user data associated with that redundant logical address, which is supposed to be stored at the first memory location, is no longer available. Without the redundant logical address, the memory interface might not be able to determine what kind of user data was stored at the first memory location. Following step 718, process 700 may end at step 710.

It should be understood that processes 600 and 700 of FIGS. 6 and 7, respectively, are merely illustrative. Any of the steps may be removed, modified, or combined, and any additional steps may be added, without departing from the scope of the invention.

The described embodiments of the invention are presented for the purpose of illustration and not of limitation, and the invention is only limited by the claims which follow.

What is claimed is:

1. A method of storing data in a non-volatile memory, the method comprising:
   receiving a first write request to write first user data to a first logical address;
   storing a copy of first metadata that corresponds to the first user data in a buffer;
   setting a first directional field indicative of a location where the copy of first metadata is to be stored, wherein the directional field comprises a flag that specifies a direction relative to a physical location of where there first user data is to be written so that the location of the copy is positioned directionally adjacent to the physical location of the first user data, wherein the flag set to one of a plurality of numbers, where each number corresponds to a physical page located directly adjacent to the physical location of the first user data;
   writing the first user data, the first metadata and first directional field as part of a single write operation at a physical location corresponding to the first logical address;
   receiving a second write request to write second user data to a second logical address, the second logical address corresponding to the location; and
   writing the second user data, a second metadata, a second directional field, and the copy of the first metadata from the buffer in the non-volatile memory in a single write operation at a physical location corresponding to a second logical address, wherein the physical location of the second logical address is positioned directionally adjacent to the physical location of the first logical address as specified by the flag in the first directional field.

2. The method of claim 1, wherein the first directional field comprises:
   a flag that indicates the direction from the first logical address to the second logical address.

3. The method of claim 2, wherein the first directional field further comprises:
   an indicator of geometric relationship between the first and second logical addresses.

4. The method of claim 1 further comprising:
   receiving a third write request to write additional user data to a third logical address; and
   writing the additional user data, a third metadata, a third directional field, and the copy of the second metadata from the buffer in the non-volatile memory in a single write operation at the third logical address.

5. The method of claim 1, wherein the non-volatile memory comprises flash memory, the first logical address corresponds to a physical address and the physical address corresponds to a page of the flash memory.

6. The method of claim 3 further comprising:
   determining an offset between a first physical address corresponding to the first logical address and a second physical address corresponding to a second physical address; and
   programming the indicator with the offset.

7. The method of claim 6 further comprising:
   receiving a third write request to write additional user data to a third logical address, wherein the programming further comprises programming the third logical address at a third physical address.

8. The method of claim 1, wherein writing the second user data comprises:
   retrieving the copy of the first metadata from the buffer; and
   computing the second metadata that is associated with the second user data; and
   programming the copy of the first metadata and the second metadata at a physical address corresponding to the first logical address.

9. A memory interface for accessing a non-volatile memory, the memory interface comprising:
   a bus controller for communicating with the non-volatile memory; and
   control circuitry configured to direct the bus controller to store first user data and metadata in a first memory location of the non-volatile memory, wherein the metadata comprises:
      first metadata associated with the first user data,
      a redundant copy of a second metadata associated with a second user data that was stored at a different memory location of the non-volatile memory; and
      a first directional flag that indicates the relative direction between the first memory location and a memory location where the original version of the second metadata is stored, wherein the first and second memory locations are positioned directionally adjacent to each other, wherein the first directional flag is set to one of a plurality of numbers, where each number corresponds to a physical page located directly adjacent to the first memory location.

10. The memory interface of claim 9, wherein:
    the first metadata comprises at least one of a first logical address, the directional flag, and data associated with the first user data, and
    the second metadata comprises a second logical address, a second directional flag, and data associated with the second user data.

11. The memory interface of claim 9, wherein the control circuitry is further configured to select the second metadata for storage in the first memory location based on a geometric relationship between the first and second memory locations.

12. The memory interface of claim 9, wherein the metadata further comprises third metadata associated with third user data stored at a third memory location of the nonvolatile memory.

13. The memory interface of claim 9, wherein the non-volatile memory comprises a flash memory, wherein the first memory location comprises a first page of the flash memory, and wherein the second memory location comprises a second page of the flash memory.

14. The memory interface of claim 13, wherein the flash memory comprises a plurality of super blocks, wherein each of the super blocks comprises a sequence of blocks, wherein the first memory location and the second memory location are located in adjacent blocks of one of the super blocks, and wherein the first memory location and the second memory location correspond to pages having a same page number in their respective block.

15. The memory interface of claim 13, wherein the flash memory comprises a plurality of super blocks, wherein each of the super blocks comprises a sequence of pages, and wherein the first memory location and the second memory location are located in adjacent pages of one block of the plurality of blocks.

16. An electronic device comprising:
    a non-volatile memory; and
    control circuitry operating under the control of a plurality of modules, the modules comprising:

a file system configured to issue a first write command to write first user data to the non-volatile memory; and a memory interface configured to store first metadata at a plurality of memory locations of the nonvolatile memory, wherein the first metadata is associated with the first user data and includes directional information indicative of where at least one redundant copy of the first metadata will be stored, wherein the directional information comprises a flag set to one of a plurality of numbers, where each number corresponds to a physical page positioned directionally adjacent to the memory location of where the first user data is stored.

17. The electronic device of claim 16, wherein the file system is further configured to request that the first user data be stored at a first logical address, and wherein the first metadata comprises the first logical address and the directional information.

18. The electronic device of claim 16, wherein the memory interface is further configured to store the first user data with the first metadata at a first memory location of the plurality of memory locations.

19. The electronic device of claim 17, wherein:

the file system is further configured to issue a second write command to write second user data to the nonvolatile memory; and the memory interface is further configured to store second metadata and the second user data with the first metadata at a second memory location of the plurality of memory locations, wherein the second metadata is associated with the second user data.

20. The electronic device of claim 16, wherein the control circuitry is implemented on a system-on-a-chip.

21. A method of recovering a logical address from a non-volatile memory, the method comprising:

determining whether first data stored at a first memory location of the non-volatile memory is accessible, wherein the first data comprises first user data and a first logical address associated with the first user data;

in response to determining that the first data is inaccessible, reading second data from a second memory location of the non-volatile memory based, at least in part, on a directional flag associated with the first memory location, wherein the directional flag is set to one of a plurality of numbers, where each number corresponds to a physical page that specifies that the second memory is positioned directionally adjacent to the first memory location; and extracting the first logical address from the second data.

22. The method of claim 21 further comprising, in response to determining that the first data is accessible, extracting the first logical address from the first data.

23. The method of claim 21, wherein the determining comprises:

reading the first data from the first memory location of the non-volatile memory;

applying error detection or correction to the first data; and determining that the first data is inaccessible based on the applying.

24. The method of claim 21, wherein the determining comprises:

reading the first data from the first memory location of the non-volatile memory; and determining whether the non-volatile memory returns a vector signaling a failed read operation responsive to the reading.

25. The method of claim 21 further comprising:

determining whether the second data stored at the second memory location is accessible, wherein the extracting is performed responsive to the determining that the second data is accessible.

26. The method of claim 25, wherein the second data comprises the first logical address, second user data, and a second logical address associated with the second user data.

27. A memory interface for accessing a non-volatile memory, the memory interface comprising:

a bus controller for communicating with the non-volatile memory; and control circuitry configured to:

direct the bus controller to read from a first memory location to obtain first user data;

determine that the first user data is not accessible from the first memory location; and direct the bus controller to read second data from a second memory location based, at least in part, on a directional flag, wherein the second data comprises first metadata associated with the first user data, and wherein the directional flag is set to one of a plurality of numbers, where each number corresponds to a physical page specifies that the second memory is positioned directionally adjacent to the first memory location.

28. The memory interface of claim 27, wherein the second data further comprises second user data and second metadata associated with the second user data.

29. The memory interface of claim 27, wherein the first metadata comprises at least one of a logical address, a directional flag, and data associated with the first user data.

* * * * *